United States Patent [19]

Viganó

[11] Patent Number: 4,512,945

[45] Date of Patent: Apr. 23, 1985

[54] DEVICE AND METHOD FOR SPREAD APPLYING LIQUIDS, IN PARTICULAR GLUE OVER BOOK SPINES

[75] Inventor: Giovanni Viganó, Milan, Italy

[73] Assignee: PLASTIVER S.a.s. di Giovanni e Vittorio VIGANO & C., Ciserano-Zingonia, Italy

[21] Appl. No.: 582,478

[22] Filed: Feb. 22, 1984

[30] Foreign Application Priority Data

May 19, 1983 [IT] Italy ............................ 21182 A/83

[51] Int. Cl.[3] ............................................ B32B 3/00

[52] U.S. Cl. .................................. 264/263; 118/410; 156/291; 156/578; 156/908; 412/37; 425/128; 425/129 R; 427/285

[58] Field of Search ............... 118/404, 405, 410, 427, 118/428; 156/578, 303.1, 293, 298, 908, 291; 425/123, 127, 128, 129 R; 412/37, 901; 264/241, 249, 252, 263, 275; 427/285

[56] References Cited

U.S. PATENT DOCUMENTS

| | | | |
|---|---|---|---|
| 2,774,326 | 12/1956 | Nelson | 118/410 X |
| 3,071,106 | 1/1963 | Burelbach | 118/410 X |
| 3,285,225 | 11/1966 | Recor | 118/410 |
| 3,362,302 | 1/1968 | Friedman | 425/129 R |
| 3,384,931 | 5/1968 | Cochran et al. | 425/128 |
| 3,521,602 | 7/1970 | Goghill | 118/410 |
| 4,145,171 | 3/1979 | Guyowski | 118/410 X |
| 4,263,348 | 4/1981 | Renegar | 118/404 X |

*Primary Examiner*—David Simmons
*Attorney, Agent, or Firm*—Browdy and Neimark

[57] ABSTRACT

The invention is concerned with the field of devices for spread-applying liquids, and in particular, with a device and method for spread-applying glue on the spine region of a book.

The technical problem to be solved was that of providing bookbinding machines which could spread glue controllably and evenly, and apply said glue on all the suitable locations for glueing and only there.

The problem is solved by providing a device which has a pair of containment lateral sides arranged at extrusion nozzles and alongside the path followed by said book spines, said lateral sides being movable to and away from each other and defining an extrusion chamber which envelopes both said spine and book edges adjacent it, and has a working chamber operative to supply said nozzles with glue and being confined between two juxtaposed pressure elements which are movable together with said containment lateral sides.

13 Claims, 6 Drawing Figures

DEVICE AND METHOD FOR SPREAD APPLYING LIQUIDS, IN PARTICULAR GLUE OVER BOOK SPINES

BACKGROUND OF THE INVENTION

This invention relates to a device and method for spread-applying liquids, in particular glue over book spines.

As it is known, books, magazines, and pamphlets in general are coated with a glue over the spine region thereof prior to applying on them a protective outside cover which may have varying degrees of rigidity. Such a glue application step is of essential import to the strength and quality of the books or pamphlets, because of its primary contribution to holding the various parts thereof together. It is carried out in accordance with two basic techniques: contact spreading and spray application.

Contact spreading makes use of either rollers or brushes which, in contacting the spines of books or pamphlets, transfer the required glue thereto. Spray application utilizes spray nozzles which irrigate the spines of the books and are supplied with glue from specially provided pump members.

All of the aforesaid devices have disadvantages of considerable practical importance. Rollers and brushes tend to apply the glue in insufficient amounts where the spines happen to be uneven, the glue only depositing on the raised portions of the spines. Furthermore, rollers and brushes are required to match the shape of the spines to be coated, thereby they must be replaced each time that the type of pamphlet, book, or magazine varies. It should be also noted that in order to coat the book edges directly adjacent the book spines, as well as the spines proper, a plurality of rollers or brushes are to be provided which are arranged to be mutually perpendicular and define, accordingly, a device of relatively complex construction.

The devices utilizing spray nozzles tend, on the other hand, to irrigate the spines in an overabundant fashion, which not only results in a waste of glue but also in the glue running to soil parts of the books which are not intended to receive it. The problem cannot be obviated with current techniques, because while the glue is to be sprayed with some power, not all the glue can be made to adhere on the books and a part of it will tend to run unevenly from the spraying locations. Also specially difficult, with current techniques, is to confine the coating areas on which the nozzles or extruders are to act, where said areas include edges of the books adjacent the spines. And in all cases, said edges require the provision of specific extruders for the coating thereof.

SUMMARY OF THE INVENTION

In the light of the aforesaid problems, it is a primary object of this invention to remove such prior drawbacks by providing a device and a method whereby bookbinding machines can be made to only apply glue at desired locations, and at all of them, in the exact amounts required for proper glueing.

This object is substantially achieved by a devie which comprises storage members for said glue, glue extruder members having a plurality of nozzles, and entrainment and guide means for said books adapted to move said books past said extruder members with said spines facing said nozzles, and is characterized in that said extruder members comprise at least one reservoir chamber arranged to communicate with said nozzles, at least one pressure element adapted to diminish and alternately augment the internal volume of said reservoir chamber, and at least one pair of containment lateral sides extending alongside the path of said spine and defining an extrusion chamber located on the opposed side to said reservoir chamber with respect to said nozzles and adapted to receive both said spine and adjacent edges of a book, and in that said containment lateral sides are moveable to and away from each other under control by a drive member and engaged with said pressure element and movable together therewith.

Advantageously, said device implements a method which comprises an irrigation step by extrusion of coating through nozzles, and is characterized in that an area to be coated is enclosed, at the time of extruding, between containment lateral sides, and in that said irrigation step by extruding alternates with a suction step, said steps being carried out by compressing and expanding a reservoir chamber containing a liquid to be spread.

BRIEF DESCRIPTON OF THE DRAWINGS

Further features and advantages of the invention will be apparent from the following description of a preferred, but not exclusive, embodiment of a device and method for spread-applying liquids, with reference to the accompanying illustrative drawings, where:

DESCRIPTION OF THE PREFERRED EMBODIMENT

Figures 1, 2:
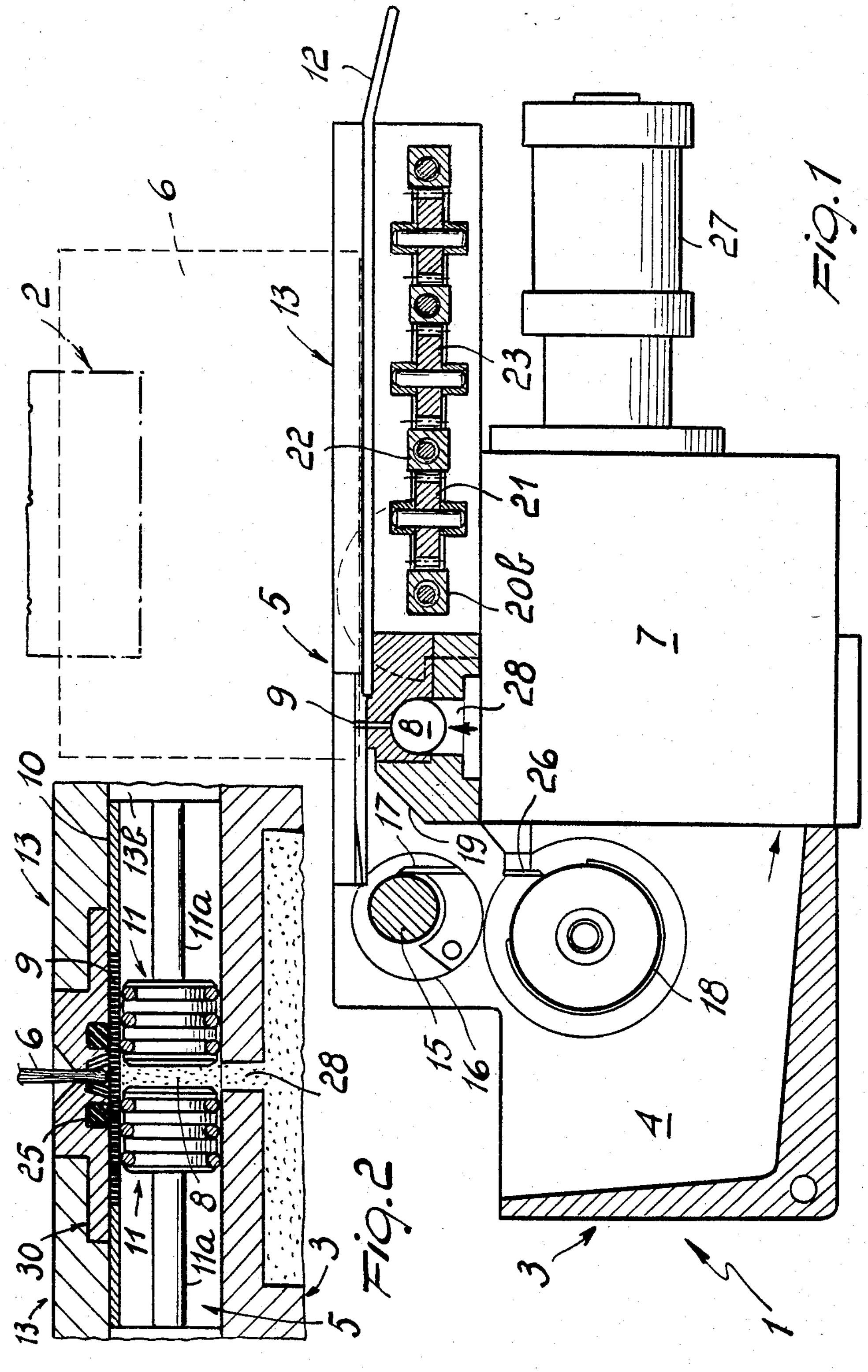
FIG. 1 is a partly sectional elevation view of the device according to this invention.
FIG. 2 is a fragmentary sectional view of this device taken along the line II—II of FIG. 1.

Making reference to the drawing views, the device according to this invention is generally designated with the reference numeral 1.

It comprises in essence a guide and entrainment means 2 for the objects to be coated with a liquid, and a case 3 accommodating storage members 4 for said liquid, as well as extruder members 5 therefor acting on the objects 6 engaged by said entrainment and guide means 2. Between the extruder members 5 and storage members 4, there intervenes a pump 7, also within the case 3.

In the illustrated embodiment, the device 1 is designed to spread-apply glue over objects 6 defined by books or the like, and the entrainment and guide means 2 are in practice formed by gripper members, known per se, which would pick up the books 6 and place them, at the case 3, with their spines **6*a* facing the extruder members 5. Also known per se is the pump 7, as are the interconnections of the device 1 with those bookbinding machines whereon the books 6 are formed and which complete the books with an adequate cover element utilizing the glue applied by the extruder members 5**.

Figure 6:
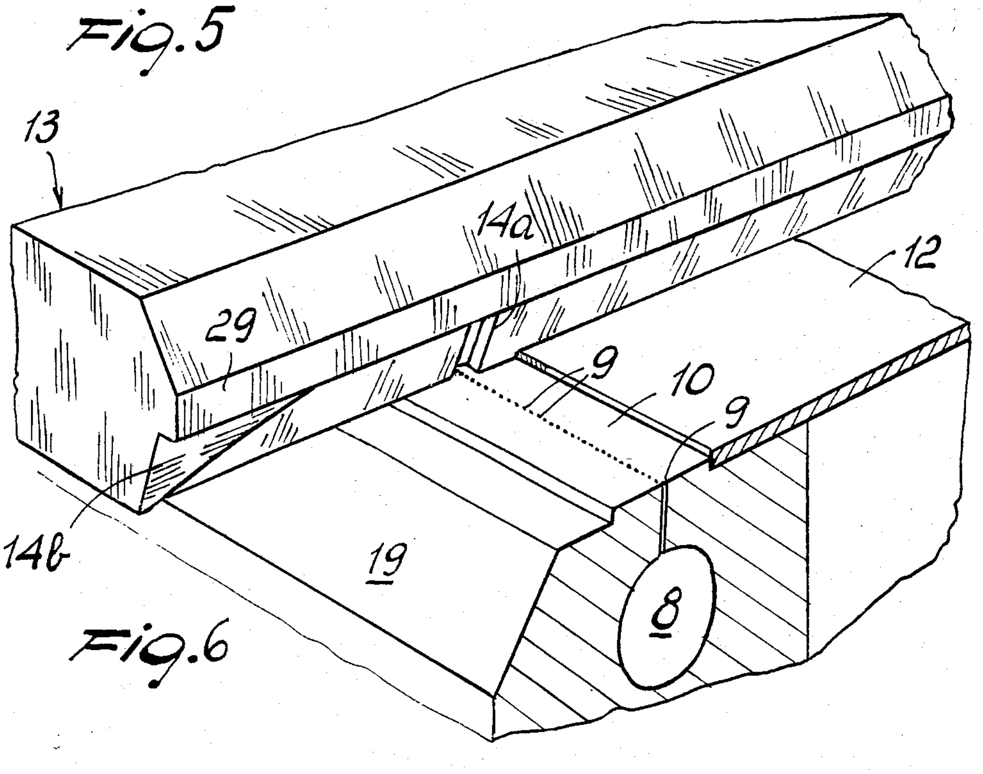
FIG. 6 is a perspective view of some elements of the inventive device.

According to the invention, the extruder members 5, being supplied from the pump 7, comprise a reservoir chamber 8 in communication with nozzles 9 opening onto a working surface 10 (FIG. 6). The reservoir chamber 8 is substantially a cylindrical cavity formed in the case 3 and extending parallel to the working surface 10. The ends of the reservoir chamber 8 are delimited by a pair of pressure elements 11 in the form of two opposed plungers arranged to be movable to and from each other to controllably vary the volume of the reservoir chamber 8. The nozzles 9 comprise a plurality of small channels which, from the reservoir chamber 8, raise vertically upwards to the working surface 10, forming an array of small holes across the path of movement of the spines of the books 6.

Figure 3:
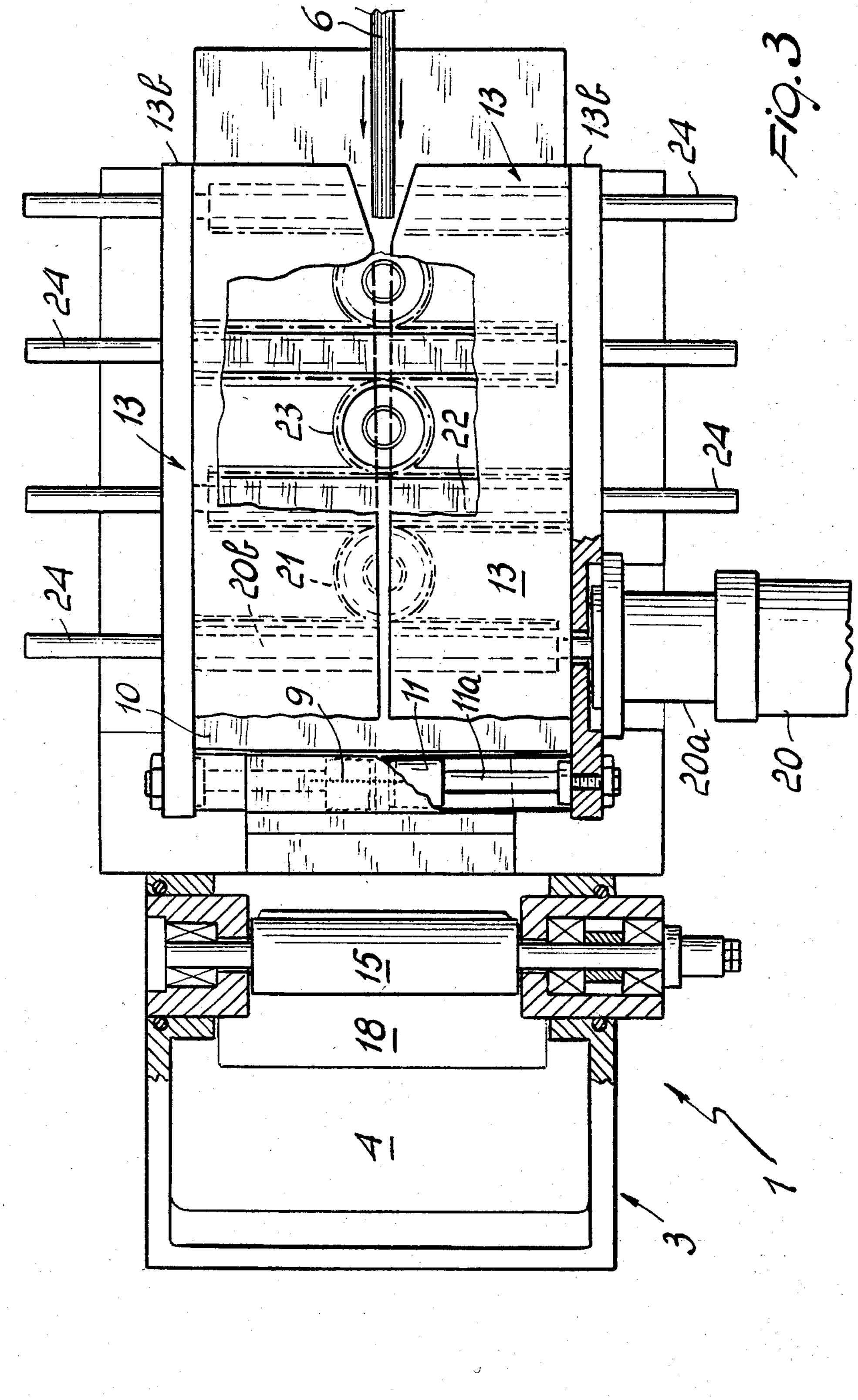
FIG. 3 is partly cut-away plan view of FIG. 1.

As clearly shown, for example, in FIGS. 1 and 3, the books 6 are caused to move forwards toward the extruder members 5 with the spines 6a bearing onto a fixed plate 12 preferably equipped with devices for heating the plate itself and hence the spines 6a. Moreover, the books 6 are moved forward between two containment lateral sides 13 which are movable toward and away from each other to clamp therebetween the edges of the books which lay directly adjacent the spines 6a. The action of the containment lateral sides 13 is, of course, such as not to hinder the forward movement of the books 6 as engaged by the entrainment and guide means 2.

Figure 5:
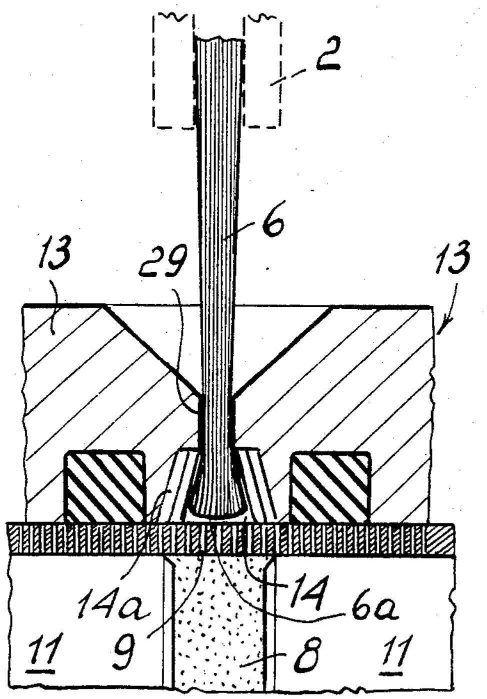
FIG. 5 is an enlarged scale view of the middle portion of FIG. 2.

As shown in particular in FIGS. 5 and 6, the containment lateral sides 13 are shaped, at the area of the extruder members 5, to define a chamber 14 enveloping both the spines 6a and the edges of the books 6 which adjoin the spines. Furthermore, the chamber 14 is expanded at the nozzles 9 by cutouts 14a adapted to facilitate the action of the nozzles 9 on the book sides. The chamber 14 is closed, on the plate 12 side, by the books 6 themselves, which are clamped between the containment lateral sides 13 and plate 12. On the opposite side, the chamber 14 opens into the storage members 4, substantially defined by a glue tank, with the interposition of some devices operative to remove any excess glue from the books 6 and make the glue coated surfaces substantially smooth. In fact, the containment lateral sides 13 are terminated at the storage members 4 with knife-edge steps 14b (FIG. 6) extending obliquely and substantially close to the book edges adjacent the spines 6a, and in the proximities of the knife-edge steps 14b, there is arranged a yarn-cutting roller 15 extending substantially parallel to the working surface 10 and substantially flush therewith with its upper edge. The roller 15 turns fast about its axis and can be positioned in height, being mounted eccentrically on a support element 16 with angular positioning capabilities. FIG. 1 further shows that the roller 15 has a doctoring blade 17.

Arranged in the storage members or tank 4, below the yarn-cutting roller 15, is a filter 18 defined substantially by a grid in the form of a cylindrical cradle. The filter 8 also received any glue being supplied from the chamber 14, owing to the provision of an incline 19 arranged substantially consecutive to the working surface 10.

As shown in FIGS. 1 and 3, the containment lateral sides 13 are movable under control by a drive member 20 formed by a cylinder the body whereof, 20a, is rigid with one of said lateral sides, while its rod 20b is rigid with the other of said lateral sides. Said rod 20b has a rack contour and engages with a pinion wheel 21 having a vertical axis, which engages in turn with a further rack 22 rigid with the containment lateral side 13 to which is attached the body 20a of the cylinder 20. This further rack 22 also meshes with a second pinion wheel 23, and so forth. In practice, as shown in FIG. 3, a kinematic train of racks and pinions is provided which makes the movement of the containment lateral sides 13 quite smooth; the racks being made alternately rigid with one or the other of said lateral sides and each pinion wheel, being caught diametrically between two parallel racks, drives the same in opposite directions. It should be also noted that the racks in question have small shafts 24 passed longitudinally therethrough which also pass slidably through said lateral sides, along vertical sides 13b thereof.

As shown in FIG. 3, it is originally envisaged that the vertical sides 13b of the containment lateral sides 13 are made directly rigid with the pressure elements or plungers 11 operating at the reservoir chamber 8. The view also shows that the rods 11a of the plungers 11 are passed rigidly through the sides 13b.

Figure 4:
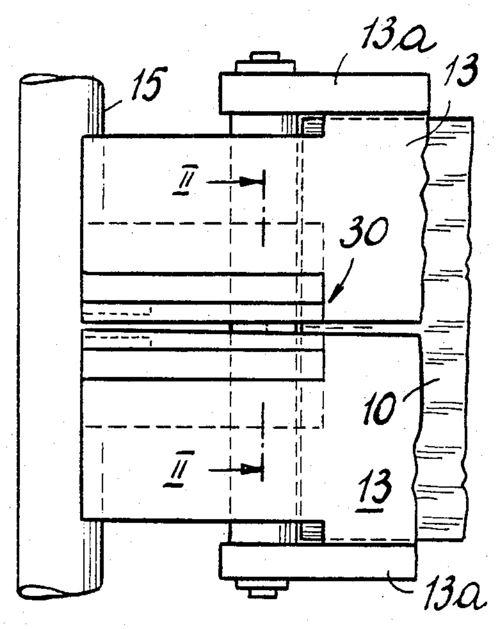
FIG. 4 is a further plan view of a portion of the device according to the invention.

The views also show some details useful to the device functionality: for example, sealing gaskets 25 interposed to the containment lateral sides 13 and working surface 10, a doctoring blade 26 at the filter 18, one or more drive cylinders 27 of the pump 7, a supply channel 28 between the pump 7 and reservoir chamber 8 located centrally to the chamber itself (FIG. 2) and a bevelled contour of the containment lateral sides 13 at their facing sides. In practice, the containment lateral sides 13 have (FIG. 6) a thin front contact strip 29 adjoined sideways by inclined surfaces, as also shown in FIG. 5. It is also contemplated that the portion of the containment lateral sides 13 which extends from the area of the nozzles 9 to the knife-edge steps 14b is formed from small blocks 30 inserted rigidly on the lateral sides themselves, as shown in FIGS. 2 and 4.

The device operates as follows.

Books 6, or other elements having an equivalent contour shape, are caused to move forward in a manner known per se by the entrainment and guide means 2, into a bookbinding machine which makes the books themselves. The books are held in an upright position with their spines 6a facing downwards and being substantially unrestricted. Furthermore, during this processing step, the books are still without an adequate cover sheet thereon. The case 3 is adjacent the path followed by the spines 6a, as dictated by the entrainment and guide means 2; as shown in FIGS. 1 and 3, the books are moved forward with their spines 6a bearing on the plate 12, equipped with heater elements, and are introduced in the nip between the containment lateral sides 13, which are brought together by an equal amount to the thickness of the books.

On the spines 6a reaching the chamber 14, the containment lateral sides 13 are clamped elastically onto each other firmly catching therebetween a portion of the spines and the adjoining edges, without, however, hindering the books 6 in their forward movement. The movement of mutual approach of the containment lateral sides 13 is provided by the drive member 20, which drives both said lateral sides through the cited rack and pinion kinematic train.

The movement of the containment lateral sides 13 is transmitted rigidly to the plungers 11, which compress the reservoir chamber causing the glue contained therein to be pushed out. The glue exits the nozzles 9 opening into the spray chamber 14; the plungers are aligned vertically to the lateral sides 13 and block the other nozzles 9 (FIG. 5). The glue being extruded sweeps not only the spines 6a, but also the adjacent book edges, owing both to the dimensions of the chamber 14 and to the provision of the cutouts 14*a* which expand the chamber.

Replenishment of the extruded glue is controlled by the pump 27, but the issuing thereof, and interruption of the extrusion, is practically determined by the plungers 11 which are responsive to the slightest movements of the containment lateral sides 13.

In particular, as the containment lateral sides 13 move away from each other, the reservoir chamber 8 expands causing not only a stop in the delivery of glue, but also a back-suction action. The latter causes immediate return of any excess glue present in the chamber 14. The excess glue may in any case flow freely toward the storage members 4 after going through the filter 18. The glue deposited on the book 6 is also partly scraped away by the yarn-cutting roller 15 and knife-edge steps 14*b*.

As a whole, the device can act in a highly accurate and ready manner, and where the forward movement and positions of the books 6 are controlled electronically, is also able to only coat limited portions of the spine length, which results in a glue saving. For example, it would be possible to limit delivery of glue to the middle region of the book, so as not to impregnate margins to be trimmed.

The device of this invention provides a novel method of spread-applying liquids.

In accordance with this method, the irrigation steps alternate with suction steps, so as to instantaneously interrupt the irrigation step. Further, extrusion is effected in an area enclosed between containment lateral sides which accurately delimit the glue receiving locations. Also, the start and end of the extrusion step are not controlled by actuating a pump, which would unavoidably offer inertias and delays, but rather through the containment lateral sides acting directly on a reservoir chamber supplied from a pump. This increases considerably the efficiency and rate of operation of the device.

By enclosing the book parts to be impregnated with glue only at the time of extrusion, it becomes possible to impart the containment lateral sides with a relatively powerful mutual approaching motion. This, in conjunction with the small size of the front strips 29 which bear directly on the book sides, results in a shaping action on the book being formed, as shown in FIG. 5. Thus, a still higher degree of efficiency is achieved for the device.

It should be further enhanced that the device adapts itself readily for books having different sizes, and that the glue curing is greatly favored by the heating action of the plate 12.

The invention as conceived is susceptible to many modifications and variations without departing from the scope of this inventive concept.

Further, all of the details and component parts may be replaced with technically equivalent elements.

In practicing the invention, the materials used, and the shapes and dimensions, may be any ones contingent on individual requirements.

I claim:

1. A device for spread-applying liquids, in particular glue over the spines of books, comprising glue storage members, glue extruder members having a plurality of nozzles, and means of entraining and guiding said books adapted to move said books past said extruder members, with said spines facing said nozzles, characterized in that said extruder members comprise: at least one reservoir chamber in communication with said nozzles, at least one pressure element adapted to diminish and alternately augment the internal volume of said reservoir chamber, and at least one pair of containment lateral sides extending alongside the path of movement of said spines and defining a chamber located on the opposed side to said reservoir chamber relatively to said nozzles and adapted to receive both said spine of a book and adjacent edges thereof, and in that said containment lateral sides are movable toward and away from each other under control by a drive member and are engaged with said pressure element and movable together with said pressure element.

2. A device according to claim 1, characterized in that said reservoir chamber is supplied from a pump and is delimited, at opposed faces thereof, by a pair of pressure elements movable to and from each other and defined by two plungers.

3. A device according to claim 2, characterized in that said lateral sides are both movable, each lateral side being rigid with and vertically superimposed on one of said plungers.

4. A device according to claim 2, characterized in that said nozles are substantially defined by a plurality of small channels extending from said reservoir chamber to a working surface facing said books, said small channels being arranged in an array across the path of movement of said spines extending substantially parallel to the direction of movement of said plungers.

5. A device according to claim 1, characterized in that said containment lateral sides have substantially thin front contact strips adapted to engage directly with opposed sides of said books in the proximity of said spines, said strips being sided by oblique portions of said lateral sides.

6. A device according to claim 4, characterized in that said chamber is expanded by cutouts formed in said lateral sides at said crosswise array wherein said small channels are arranged.

7. A device according to claim 3, characterized in that said containment lateral sides are movable to and from each other under the drive provided by a kinematic train of racks and pinions driven by said drive member.

8. A device according to claim 2 wherein said containment lateral sides have substantially thin front contact strips adapted to engage directly with opposed sides of said books in the proximity of said spines, said strips being sided by oblique portions of said lateral sides.

9. A device according to claim 3 wherein said containment lateral sides have substantially thin front contact strips adapted to engage directly with opposed sides of said books in the proximity of said spines, said strips being sided by oblique portions of said lateral sides.

10. A device according to claim 4 wherein said containment lateral sides have substantially thin front contact strips adapted to engage directly with opposed sides of said books in the proximity of said spins, said strips being sided by oblique portions of said lateral sides.

11. A method of spread-applying liquids, in particular glue over the spines of books, comprising an irrigation step carried out by extrusion, and characterized in that at the time of extrusion the area to be impregnated is enclosed between containment lateral sides, and in that said irrigation step by extrusion is alternated with a suction step, said steps being carried out by compressing and expanding a reservoir chamber containing said liquid.

12. A method according to claim 11, characterized in that said extrusion and suction steps are carried out simultaneously with the engagement and respective disengagement of said containment lateral sides with/-from said area to be impregnated.

13. A method according to claim 11, characterized in that said containment lateral sides are engaged with said books with an elastic approaching movement brought about forcibly to effect a shaping step of said books.

* * * * *